Dec. 22, 1931.  E. WEIGLE  1,837,932
SYRINGE
Filed July 2, 1929  3 Sheets-Sheet 1
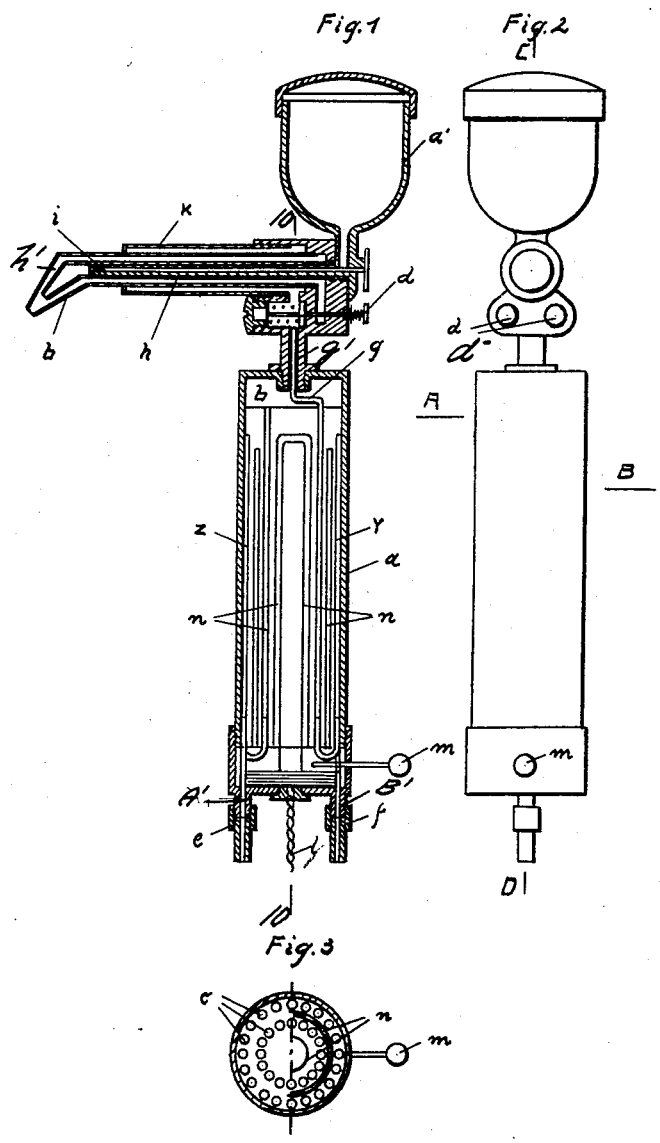
INVENTOR
E. WEIGLE Dec. 22, 1931.  E. WEIGLE  1,837,932
SYRINGE
Filed July 2, 1929   3 Sheets-Sheet 2
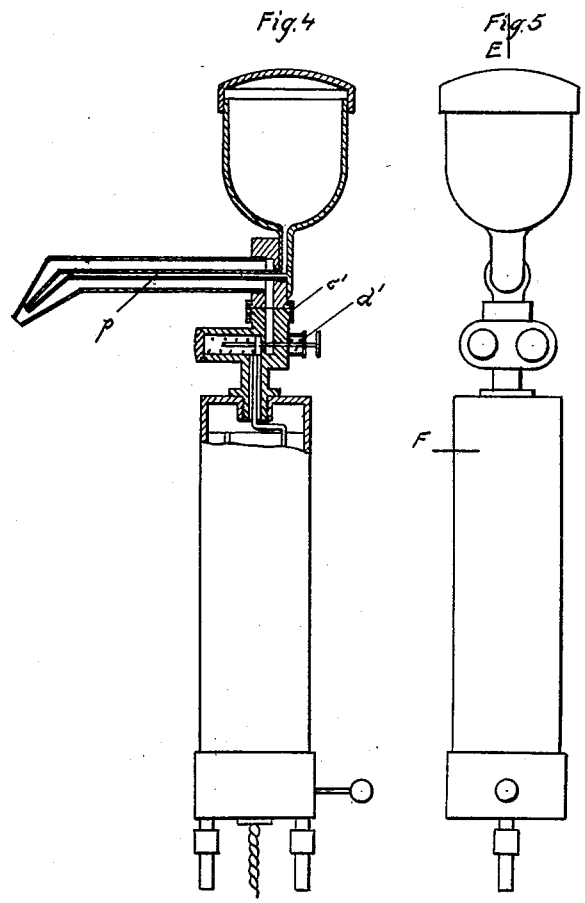
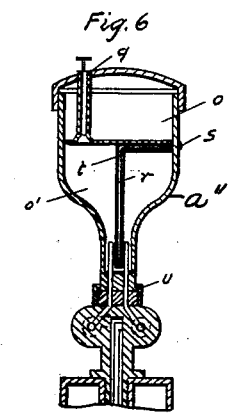
INVENTOR
E. WEIGLE Dec. 22, 1931.  E. WEIGLE  1,837,932
SYRINGE
Filed July 2, 1929  3 Sheets-Sheet 3
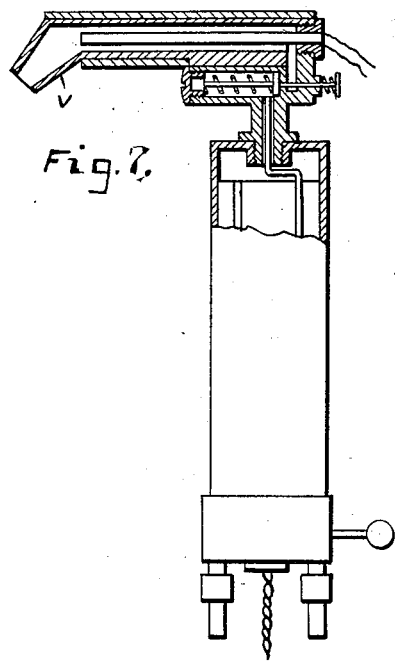
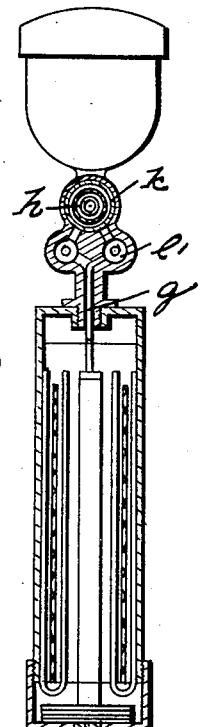
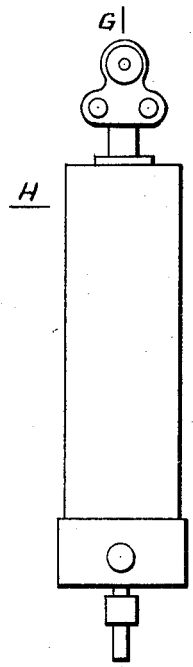
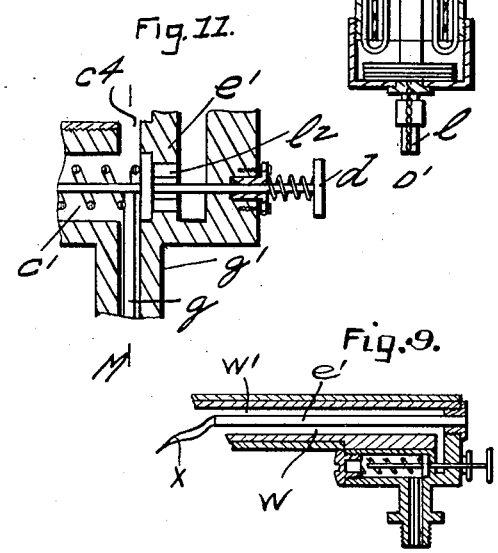
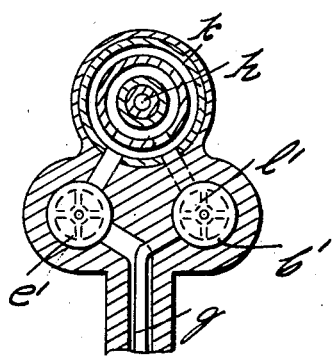
INVENTOR
E. WEIGLE Patented Dec. 22, 1931

1,837,932

UNITED STATES PATENT OFFICE

ERNST WEIGLE, OF STUTTGART, GERMANY

SYRINGE

Application filed July 2, 1929, Serial No. 375,536, and in Austria February 14, 1929.

This invention relates to syringes designed particularly for medical use, in the use of which the vehicle for carrying the medicament is designed to be more or less heated.

In syringes of this type, the heating action is usually inaugurated simultaneously with opening the valve with which the vehicular fluid is admitted to the syringe. As a result of this arrangement the initial outflow of the fluid and medicament is ordinarily much cooler than that desired and not infrequently, after some continued use of the syringe, the vehicular fluid becomes too hot.

It is an object of the present invention to maintain in the syringe a constant reserve supply of vehicular fluid which is constantly maintained at the desired temperature in order that the initial outflow in the use of the syringe is at the proper temperature and this temperature is maintained during the continued use of the syringe.

The invention is directed to a construction involving a supply chamber of tubular form with a comparatively thick wall in which a tortuous passage is arranged for the flow of the vehicular fluid, with means for constantly or at will maintaining this comparatively thick wall in a desired condition of heat, whereby the reserve chamber thus provided is constantly charged with a supply of vehicular fluid maintained at the desired temperature, thus insuring that the initial flow of the fluid with the contained medicament is at the proper degree of heat, and further that such degree of heat is maintained during the further use of the syringe.

The warmed material to be handled in the syringe is always ready for use at the desired temperature. If a portion of the warmed syringe material, that is the vehicular fluid, is used up, then the heater automatically connects itself and the subsequently introduced cold vehicular material is rapidly heated and reaches the predetermined desired temperature materially in advance of its reaching the delivery nozzle.

This invention is illustrated in the accompanying drawings, in which:

Figure 1 is a view in vertical section of one form of the syringe.

Figure 2 is an elevation of the same.

Figure 3 is a section on line 3—3 of Figure 1.

Figure 4 is a view in elevation, partly in section, of a slightly modified form of syringe.

Figure 5 is an elevation of the same taken at right angles to the view of Figure 4.

Figure 6 is a vertical section of a slightly modified form of container.

Figure 7 is a view in elevation, partly in section, of a further form of syringe.

Figure 8 is a view in elevation of the same, taken at right angles to the view in Figure 7.

Figure 9 is a vertical section through the syringe nozzle designed primarily for the delivery of heated air.

Figure 10 is a section on line 10—10 of Figure 1.

Figure 11 is a sectional detail showing the mounting and means for permitting operation of one of the valves.

Figure 12 is an enlarged vertical section showing the means for admitting the different vehicular fluids to the syringe nozzle.

In the form shown in Figures 1, 2 and 3, the heating chamber for the initial supply of vehicular fluid is shown as including a casing $a$ having such diameter as to permit it to be conveniently grasped in the hand. The wall of this casing is comparatively thick and is formed with longitudinally ranging series of tubes $c$ and $c^2$. These respective sets of tubes each provide a tortuous passage for the particular vehicular fluid, the tube sections ranging longitudinally of the casing and being interconnected to provide a tortuous conveyor.

The tubes $c$ are designed for the passage of water or like liquid, the inlet end communicating with a supply tube $e$ opening through the bottom of the casing, the delivery end opening into a space $b$ at the top of the casing which thus constitutes a manifold. The tubes $c^2$ are designed for a gaseous vehicle and are likewise in tortuous form to constitute a single conduit, the inlet end being through a connection $f$ at the bottom of the casing and the outlet end extending in the form of a pipe $g$ through the neck $g'$ which connects the casing with the syringe proper.

The wall of the casing $a$ is formed between the tubular bores with a longitudinally ranging channel in which is arranged a conventional resistance element energized through conductors $l$ leading through the bottom of the casing, with the current manually controlled by a conventional switch $m$ in order that the metal of the thickened walls may be maintained at the desired temperature and thus the vehicular fluid initially heated to the desired extent before reaching the upper manifold.

Removably secured to the upper end of the casing $a$ is a syringe nozzle including a body through which a tube $g$ extends to permit the delivery to the nozzle of the gaseous vehicular fluid. The nozzle includes a medicament tube $h$ in open communication with a medicament container $a'$ removably secured upon the nozzle body. The delivery tube for the medicament has its outlet end provided with a valve $i$ forming the terminal of a threaded rod provided with manually operable means arranged beyond the nozzle body, to thereby provide for a suitable delivery and the control of the delivered quantity of the medicament. A nozzle tube surrounds the medicament tube, forming a continuation thereof, and having a conical nozzle outlet $h'$.

A tube $b$ surrounds the medicament delivery tube in spaced relation thereto and terminates in a conical nozzle surrounding and extending beyond the nozzle $h'$. A warming tube $k$ surrounds and is closed against the tube $b$. Valves $d$ control at will the communication with the casing $a$ to admit a desired quantity of the vehicular fluid of either type to the tube $b$, the flow of which vehicular fluid under pressure serves to draw the medicament through the tube $h$ and nozzle $h'$ to mix with the vehicular fluid for delivery. The warming tube $k$ is at all times open to the heated vehicular fluid so that the nozzle parts are heated in correspondence with that of the casing $a$.

The syringe proper has an enlargement directly overlying the neck $g'$, which enlargement provides a chamber $c'$ which communicates, by means of a passage $c^4$, with the space between the tubes $b$ and $k$. The neck $g'$ is of sufficient diameter to provide a space surrounding the tube $g$ for the flow of heated water or liquid to within the tube $k$. The rear of the enlargement provides a space $e'$ which is in communication with the space between the tubes $h$ and $b$ in the nozzle, this space $e'$ being in communication with the space $c'$ of the enlargement through passages $e^2$ controlled by a valve $d$ operable from beyond the enlargement, as shown in Figure 11.

A similar space $f'$ in the enlargement is arranged to communicate with the pipe $g$ controlled by a valve $d'$, such space $f'$ also communicating with the space between the tubes $b$ and $h$ of the syringe. It will of course be apparent that the heated fluid is thus freely admitted to the space between the tubes $k$ and $b$ for maintaining the exterior of the tube warm and that the vehicular fluid may be selectively admitted to the interior of the tube $b$ by the control of the appropriate valve.

In the form shown in Figures 4, 5 and 6, the parts are as described in the preferred form except that the warming tube $k$ is omitted and a mixing container, as illustrated more particularly in Figure 6, is used. This container $a^3$ is provided with a transverse partition, providing a medicament chamber $o$ having a valve outlet in the partition controlled by a valve $q$. The medicament container presents below the medicament chamber a mixing container $o'$, preferably transparent, and in this mixing chamber is arranged a stand-pipe $r$ in the form of a tube of small bore, the upper end of which opens through the wall of the container in the form of a jet $s$.

By control of the valves $d'$ in this case, the vehicular liquid is permitted to enter the mixing chamber, accumulating therein, and the medicament, by control of the valve $q$, is permitted to enter and mingle with this liquid. The other valve is then opened to admit the vehicular fluid of gaseous form which, rising above the surface of the liquid in the container, forces such liquid, together with the contained medicament, through the stand-pipe $r$ and out through the outflow jet $s$. If desired, a small opening $t$ may be formed in the stand-pipe near the upper end to permit the direct entrance of a small quantity of the gaseous vehicle to increase the atomization of the liquid delivered through the outflow jet $s$. This container is secured to the syringe body by lock nut $u$.

A third form is shown in Figures 7 and 8, wherein the syringe body contemplates the use of a gaseous vehicle only. In this instance, the heatable hand syringe is assumed to have only a pressure means, in this case gas, particularly carbon dioxid, for the purpose of drying out teeth, as also for treating sensitive dentine during boring by the blowing of warm carbon dioxid into the cavity of the corresponding tooth. This hot air blower has the great advantage over all previously known ones that the entering gas in the heatable container is available already warmed to 50 to 60°, thus immediately leaving the jet in warm condition, and not as in the previous ones, first leaving the jet in cold condition, which produces pain in the tooth to be treated. Further, the auxiliary heating arrangement arranged in the discharge jet need be used only in very few cases, particularly for diagnostic purposes, since the warm air located in the supply chamber suffices for drying out the teeth and thus a burning of the mucous membranes of the mouth is prevented.

A further arrangement heretofore not provided on hot air blowers is the bent removable point $v$ of the jet in place of which the copper tube $w$ is pushed over the heating body and the heating body is put in action without the addition of hot air. The portion of the copper tube $w'$ situated upon the heating body, and terminating in a thin wire $x$ is now inserted into a root canal of a tooth, which makes possible the thorough drying out of these canals and which is not possible with any air blower. This copper wire may also be used as a cautery.

What is claimed to be new is:

1. A heatable syringe including a casing, a series of tubular conduits therein, means for heating the material in the conduits, a nozzle including an exterior tube, an intermediate tube and an inner medicament tube, means whereby the heated vehicular fluid from one of the conduits is freely admitted between the exterior tube and intermediate tube, means whereby the vehicular fluids may be selectively admitted between the intermediate tube and medicament tube, and valves for controlling the selective admission.

2. A hand syringe including a casing, a tortuous conduit therein for the passage of a fluid, said conduit delivering into the upper end of the casing, a second tortuous passage therein for the delivery of gas, said second tortuous passage being closed against the casing, means within the casing for simultaneously heating the material in the tortuous passages, a nozzle having a warming space open to the heated fluid from the tortuous passage in the casing, said nozzle including a delivery space within the heating space for the passage of either fluid from the tortuous passages, and valves for controlling the delivery of the fluids to said delivery space.

In testimony whereof I affix my signature.

ERNST WEIGLE. [L. S.]